(No Model.)
H. J. REMMERT.
GAS SCRUBBER.
No. 426,326. Patented Apr. 22, 1890.
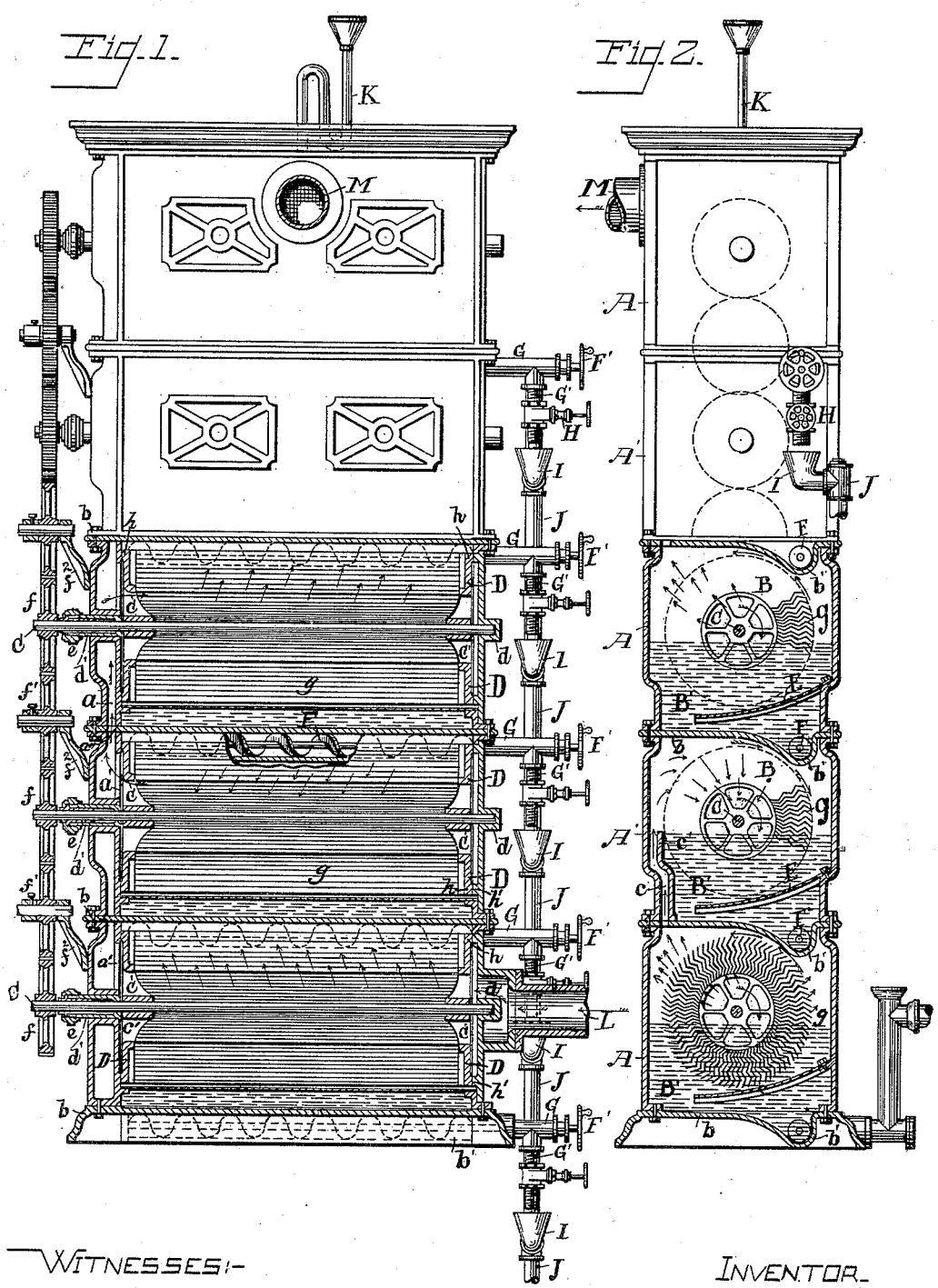
Witnesses:
Geo. G. Penney.
Will T. Norton
Inventor
Herman J. Remmert
By E. B. Clark
Attorney

UNITED STATES PATENT OFFICE.

HERMAN J. REMMERT, OF FORT WAYNE, INDIANA.

GAS-SCRUBBER.

SPECIFICATION forming part of Letters Patent No. 426,326, dated April 22, 1890.

Application filed March 26, 1888. Serial No. 268,496. (No model.)

*To all whom it may concern:*

Be it known that I, HERMAN J. REMMERT, a citizen of the United States, residing at Fort Wayne, in the county of Allen and State of Indiana, have invented certain new and useful Improvements in Gas-Scrubbers; and I do hereby declare the following to be a full, clear, and exact description of the invention, such as will enable others skilled in the art to which it appertains to make and use the same.

My invention relates to gas-scrubbers, and particularly to that class in which water or any other suitable liquid is brought into contact with the gas to free it from tarry matters, ammonia, sulphurous-acid gas, hydrochloric-acid gas, and any other deleterious agents which impair its illuminating quality.

The objects of my invention are to provide improved means for readily removing the deposited impurities of the gas from the scrubber, to increase and extend the washing and scrubbing surface of the agitators or cleaning-drums, and to otherwise increase the efficiency of such apparatus in a way to bring the water into more intimate contact with the gas and to subject the gas to a more extended scrubbing-surface. These objects I have accomplished by the scrubber hereinafter described, and illustrated in the accompanying drawings, in which—

Figure 1 represents a side elevation of the same, partly in longitudinal section; and Fig. 2 represents an end elevation, partly in cross-section.

My apparatus consists, essentially, of a series of superimposed cleaning-chambers, each containing an agitator or cleaning-drum and a screw conveyer with communications or passages for the downward passage of the liquid and the upward flow of the gas, as will now be described in detail.

The cleaning-chambers A and A', of which there may be any desired number, are made, preferably, of cast metal in rectangular form, and are arranged alternately one on top of the other. The walls of each chamber at one end are made double to form an intermediate passage $a$, which communicates with the interior of the chamber by means of an opening $a'$ in the inner wall. The passage $a$ in each of the chambers A is closed at its upper end, while that of the chambers A' has an opening $a''$ into the passage of the chamber A next above. These passages $a$, together with the openings $a'$ and $a''$, permit the gas to pass upward and the liquid to flow downward through the chambers, as will be more fully hereinafter described. The chambers are separated horizontally by partitions $b$, or, in other words, each chamber has a bottom $b$, which serves as a top for the chamber next below, and the bottom of the lowest chamber A is made flaring outwardly and downwardly to form a suitable base for the support of the entire series of chambers. The bottom $b$ of each chamber inclines downwardly and at one side terminates in a trough $b'$, which is intended to receive the deposits of tar and other impurities expelled from the gas by the washing and scrubbing process. The walls of the chambers are flanged horizontally to furnish means whereby they may be bolted or riveted together through the bottoms $b$; but it is evident that each chamber may be made complete in one casting.

On the inside of the chambers A', opposite to the side where the troughs $b'$ are located, a longitudinal passage $c$ is formed, communicating with the chamber A next below. This passage $c$ is formed by a vertical partition $c'$, cast or otherwise secured upon the bottom $b$, and extending upward to the desired height of the water-line in chamber A'.

In each of the cleaning-chambers there is formed a liquid-reservoir B', the top of which is determined by the height of opening $a'$ in chambers A and by the height of partition $c'$ in chamber A'. Above the reservoirs in these chambers are journaled the agitators or cleaning-drums B in such position that when the reservoirs are filled with water or other purifying-liquid the drums will dip some distance below the surface of the same. These drums are each mounted upon a shaft C, one end of which has bearing in a socket $d$, cast with or otherwise secured to the end wall of the chamber, while the other end passes through a suitable stuffing-box $e$, inserted in a collar $d'$, which connects the double walls of the chamber. By means of gears $f$ on the protruding ends of the shafts C and intermediate meshing gears $f'$, the shafts of which are journaled in brackets $f^2$, secured to the chambers, the several drums of the series are rotated in the same direction. Each of these drums consists, essentially, of a radial series of crimped sheet-metal plates $g$, which are separated a little one from the other for the passage of the gas and liquid. These plates are fixed to a pair of hubs C' C', mounted on the shaft C at each end of the chamber, and the ends of these plates are covered by flat annular disks D D, cast with or otherwise secured to the hubs. The crimps in each of the metal plates $g$ are made, preferably, at right angles to each other, or nearly so, and extend tangentially in opposite directions to the axis of the drums. These crimps are made successively smaller as they approach the center of the drum, and the outer one of each plate inclines in the direction in which the drum rotates, which is from left to right, so as to dip or scoop up the liquid from the reservoir as the drum revolves. All of the plates are so set that when each of them reaches a horizontal plane, drawn through the axial center of the drum, its outer edge in touching this plane on the right of the drum-shaft shall be on a lower level than any of the lower angles or points of its crimps. This feature of arrangement allows a free unobstructed passage of the gas between the plates, and prevents it from being trapped by the water. The angular plates provide a very large area of washing-surface and cause a very intimate contact of the water and gas which flow in opposite directions between the plates of the drum.

The end disks D D of the drums each have a circumferential flange $h$, which has bearing against another flange $h'$ on the end walls of the chambers near the top. These flanges may be cast with or otherwise secured to their respective parts, and their meeting surfaces should be nicely ground or turned to form a perfect joint to prevent the escape of gas at these points.

In each liquid-reservoir B', above the trough $b'$, a downwardly-curved deflecting-plate E is secured at its upper edge to a flange or ledge at one side of the cleaning-chamber, and such plates also rest upon flanges or cleats projecting from the end walls of the chambers. These deflecting-plates receive the tar and other impurities deposited thereon by the revolving drums, and conduct such deposits off onto the inclined bottoms of the chambers, from which they flow into the trough $b'$.

The inclined deflecting-plate E, together with the inclined bottom $b$ and trough $b'$, form a tar-receptacle in each chamber, and the plate prevents agitation of the tar and mixture thereof with the liquid in the chamber by the agitating-drum. As the tar drops upon the inclined plate the revolution of the drum tends to propel it downward onto the inclined bottom, which conducts it into the trough $b'$. By turning the screw conveyer F the accumulated tar can be drawn off at any time without disturbing the operation of the scrubber. The screw conveyer F is journaled in the end walls or in boxes located at the ends of the troughs. The shaft of each conveyer passes at one end through a horizontal pipe G, which communicates with one end of the trough $b'$, and is provided with a hand-wheel F', whereby the conveyer may be operated at intervals to draw off the deposits of tar, &c. Each of the horizontal pipes G is provided with a short depending branch pipe G', which has a valve H for regulating the discharge of the tar, water, &c., drawn into these pipes by the screw conveyers F. These pipes G' discharge into funnels or troughs I, attached to and leading into a vertical stand-pipe J, from which the final discharge takes place at its lower end.

At the top of the scrubber is placed a supply trap-pipe K of any ordinary construction, by means of which the water or other purifying-liquid enters the uppermost chamber A of the series. The washing-liquid passes by overflow through the communicating passages $a$ into the next chamber A', then by overflow through the passage $c$ into another chamber A, and so on alternately by these passages until it reaches the lowest chamber, when the scrubber is filled and ready for use.

From the construction above set forth it will be seen that when the several reservoirs have been filled with purifying-liquid and motion has been imparted to the several drums their plates will be kept constantly bathed with the water or other liquid. The gas to be purified enters the lowest chamber A through an inlet-pipe L, which communicates with this chamber at the center of the end opposite the passage $a$, so that the gas must necessarily pass immediately into the center of the revolving drum. From the center of the drum it radiates and passes out between the plates to the periphery of the drum, and then ascends through the vertical passage $c$ into the chamber A' above. From this chamber it has no escape except through the drum, so it must therefore pass from the periphery of the drum between the plates to the center, and then it passes through the opening $a'$ into the passage $a$ and up into the central portion of the drum in another chamber A, and so on to the uppermost chamber of the series, where it escapes through an outlet-pipe M, connecting with the main. It will thus be seen that the gas passes from the center to the periphery of one drum and from the periphery to the center of another drum, so that it is thoroughly washed and freed from its impurities before it passes from the scrubber. In addition to these cleaning-drums, which alone furnish adequate washing-surfaces, the gas as it passes from chamber to chamber is agitated in contact with the liquid in the reservoirs, and also meets the descending particles or showers of liquid thrown by the drums into the passages $a$ and $c$, so that the two are brought into very intimate contact aside from the preliminary washing by the drums.

It will be noticed that the casing of the scrubber is made up of separable chambers, each containing one cleaning-drum, thus permitting the number of drums to be varied as desired.

It will be further noticed that the end walls of each chamber are constructed so as to be removable for the examination or removal and replacement of the drums and screw conveyers; but it is evident that each chamber or the entire casing may be cast in one piece, providing that the openings are made in the casings sufficiently large to admit the drums, which openings may be closed by suitable doors tightly fitted to the casing. The former construction, however, is preferred, because it is more practical. It is also preferred to have the plates of the drums removable, for the sake of repairs, &c.

I do not wish to be confined to the precise details of construction of the cleaning-drums, as they are capable of a variety of changes without the exercise of invention. For instance, the plates $g$ can be crimped, fluted, or corrugated otherwise than at sharp right angles, as shown, or they could be curved from edge to edge, or they could be made straight; but I prefer the construction described for the best results.

Having described my invention, what I claim, and desire to secure by Letters Patent, is—

1. In a gas-scrubber, the combination, with a chamber, of a revolving scrubbing-drum mounted therein, and an inclined deflecting-plate placed between the drum and the bottom of the chamber and forming a tar-receptacle, as described.

2. In combination with a gas-scrubbing chamber having an inclined bottom, a revolving drum mounted therein, and an inclined deflecting-plate arranged between the drum and the trough of the inclined bottom of the chamber, for the purpose described.

3. In combination with a gas-scrubbing chamber having an inclined bottom and trough, an agitating-drum mounted in the chamber and a screw conveyer arranged in the trough, for the purpose described.

4. In an apparatus for scrubbing gases, the combination of a series of chambers, a series of revolving drums having central longitudinal passages arranged within said chambers, and overflow-passages connecting said chambers and the longitudinal passages of the drums, and constituting means for conducting the liquid downward from chamber to chamber and for conducting the gas upward, first from the center to the periphery of one drum, and then from the periphery to the center of another drum, and so on to the end of the series, substantially as described.

5. In an apparatus for scrubbing gases, the combination of a series of chambers connected by overflow-passages for conducting the gas upward and the liquid downward, a series of revolving drums arranged within such chambers, and a deflecting-plate located below each drum and between it and the bottom of the chamber for conducting the deposits of tar and other impurities to a receptacle below, so as to prevent the agitation and mixing thereof with the washing-liquid, as described.

6. In an apparatus for scrubbing gases, the combination of a series of chambers connected by overflow-passages for conducting the gas upward and the liquid downward, a series of revolving drums arranged within said chambers, a trough in the bottom of each chamber, in which the deposits of tar and other impurities collect, and a conveyer in each trough for drawing off these deposits, substantially as described.

7. In an apparatus for scrubbing gases, the combination of a series of chambers, each having an inclined bottom terminating in a trough on one side, a series of connecting overflow-passages for conducting the gas upward and the liquid downward, a series of revolving drums arranged within said chambers, a deflecting-plate extending below each drum, and a screw conveyer arranged in the trough of each chamber, substantially as and for the purposes set forth.

8. In an apparatus for scrubbing gases, the combination of a series of chambers connected alternately by an overflow-passage at one side and by an overflow-passage at one end, and a series of revolving drums having central longitudinal passages arranged within said chambers, substantially as and for the purpose set forth.

9. In an apparatus for scrubbing gases, the combination of a series of chambers superposed one above another and connected by overflow-passages, and a series of revolving drums located in said chambers, and each having an open longitudinal center and a series of longitudinal radial plates, substantially as and for the purposes set forth.

10. In an apparatus for scrubbing gases, the combination of a series of chambers superposed one above another and connected by overflow-passages, and a series of revolving drums located in said chambers, and each having an open longitudinal center and a series of longitudinal radial crimped, fluted, or corrugated metal plates supported at each end by hubs upon the shaft of the drum, substantially as and for the purposes set forth.

11. In an apparatus for scrubbing gases, the combination of a series of chambers connected by overflow-passages, and a series of revolving drums located in said chambers, and each composed of two hubs mounted upon its shaft, an annular plate secured to each hub, and a series of crimped, fluted, or corrugated sheet-metal plates secured to the hubs and annular plates, substantially as and for the purposes set forth.

12. In an apparatus for scrubbing gas, the combination, with a scrubbing-chamber, of a revolving drum composed of annular end plates and hubs secured to a central shaft, and longitudinal radial crimped or corrugated plates extending between the annular end plates and disposed about the shaft at a sufficient distance therefrom to form a central longitudinal passage or chamber, and a gas supply or discharge pipe connecting with such central chamber of the drum, for the purpose described.

13. In an apparatus for scrubbing gases, the combination of a series of chambers connected by overflow-passages, and a series of revolving drums, each having an open longitudinal center and a series of longitudinal crimped sheet-metal plates set parallel to the axis of the drum, the outer edges of which incline in the direction of rotation, and are so arranged as to be below the level of the lower angles of the crimps when rotated downward into a horizontal plane passing through the center of the drum, substantially as and for the purposes set forth.

14. In combination with a gas-scrubbing chamber, the revolving drum having end plates fitted to make tight joints with the end walls of the chamber, longitudinal plates disposed about the shaft, so as to form a central longitudinal passage or chamber, and a gas supply or discharge pipe opening into such central chamber of the drum, whereby gas is compelled to pass between the plates of the drum, for the purpose described.

In testimony whereof I affix my signature in presence of two witnesses.

HERMAN J. REMMERT.

Witnesses:
A. D. CRESSLER,
G. L. HACKINS.